R. S. WARING & J. B. HYDE.
Said HYDE assignor to said WARING.
PROCESS OF AND APPARATUS FOR INSULATING WIRE FOR ELECTRIC USES.
No. 10,349. Reissued July 3, 1883.
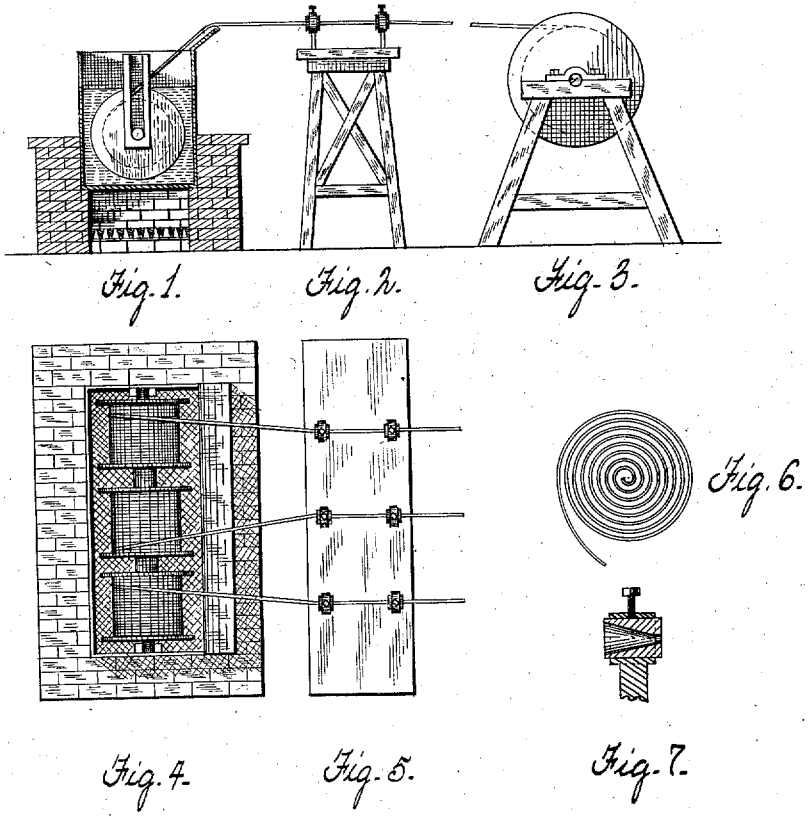
Witnesses—
F. O. McCleary.
William Paxton
Inventor—
R. S. Waring
J. Burrows Hyde
per O. E. Duffy
Atty

UNITED STATES PATENT OFFICE.

RICHARD S. WARING, OF PITTSBURG, PA., AND J. BURROWS HYDE, OF NEW YORK, N. Y.; SAID HYDE ASSIGNOR TO SAID WARING.

PROCESS OF AND APPARATUS FOR INSULATING WIRES FOR ELECTRIC USES.

SPECIFICATION forming part of Reissued Letters Patent No. 10,349, dated July 3, 1883.

Original No. 267,044, dated November 7, 1882. Application for reissue filed June 7, 1883.

*To all whom it may concern:*

Be it known that we, RICHARD S. WARING, a citizen of the United States, residing at Pittsburg, county of Allegheny, State of Pennsylvania, and J. BURROWS HYDE, a citizen of the United States, residing at the city, county, and State of New York, have invented certain new and useful Improvements in a Process for Insulating Wires for Electric Uses, of which the following is a specification, reference being had therein to the accompanying drawings.

Our invention relates to insulating wires for underground cables for telegraphs, telephones, electric lighting, and similar purposes. The wires, after being treated by our process, will be found to be advantageous for use above ground and under water, or along the beds of rivers, &c.

The object of our invention is to insulate wires by immersing them in an insulating compound, which compound will form the subject of a separate application.

Our present invention consists in the application of insulating media to electric wires in the following manner: by first covering the wire with cotton or other fibrous material in the usual way, then immersing the prepared wires, in coils or otherwise, into baths of heated insulating material at high temperature to expel all moisture therefrom and saturate the fiber with the mixture.

It further consists in the process of immersing covered wires upon reels in a bath or baths of heated insulating compound, and then drawing them from such bath-immersed reels by a second and storing reel through an intermediate and gaging mold or plate, as will be hereinafter more fully described.

Having thus described the nature of our invention, we will now describe the drawings hereto annexed, which show an example of our method of carrying the same into practice.

Figure 1 is a vertical transverse section of a molding-kettle to receive melted composition after its preparation in the melting and mixing kettle. (Not shown.) Fig. 2 is an end view of a molding-table. Fig. 3 represents a receiving and storing reel. Fig. 4 is a plan view of a series of reels in the molding-kettle. Fig. 5 is a plan view of a molding-table. Fig. 6 represents a coil of prepared wire. Fig. 7 is an enlarged view of strippers and gages *i* and *k*, with holding-band and set-screw.

The same letters denote like parts in all the figures.

*a* is a molding-kettle; *b*, the fire-place, composed of masonry, which supports the molding-kettle; *c*, the grate-bars; *d*, reels rotating on movable bearings in journals fixed in the ends of the molding-kettle, carrying fiber-covered wires; *e*, stripping-band to remove excess of hot composition from the wire as it is drawn from the kettle; *h*, molding-table; *i*, dies of metal or other proper material, having conical perforations to strip off excess of composition from the wires; *k*, molding-dies of similar shape to gage the covered wire, and *m* receiving and storing reel and stand.

In the application of insulating media to electric wires, it is common, first, to wind or braid the wire with several coverings of cotton thread by machinery, and coat or varnish this cotton with some insulator. Such covering, and particularly the cotton thread used for this purpose, is greatly hygroscopic. For example, if weighed, and then placed in an oven heated to 212° Fahrenheit, it will part with its moisture and be reduced in weight. Removed again to the air it will soon reabsorb moisture and return to its original weight. We have found that to insure reliable and permanent insulation to the wires, every possible trace of moisture must be expelled, and practically the only method for effecting that object is the one we have discovered, and wherein the moisture cannot possibly cause trouble thereafter. We place the covered wire in proper and convenient lengths upon reels that will readily fit into a heating-vessel of proper material—say two or more abreast lengthwise. The vessel, standing over a heating-furnace, is properly filled with insulating material previously melted and mixed in another vessel, and heated above 212° Fahrenheit, preferably 300°. Into this heated mixture we immerse the reels and their contents. The excessive heat will at once convert the moisture into vapor, expelling it from the cotton, and rising through the insulator as steam converts the substance near the surface into a fine frothy mass, demanding care that it does not exceed the capacity of the molding-vessel itself. The composition will at the same time penetrate the cotton to the wires, effectually sealing it against any possible penetration of aqueous matter at any time thereafter.

In working our invention we employ obsidine tempered with a softer medium to give flexibility and elasticity as a first coat, such obsidine being a residual product of petroleum distillation, jet black in color, somewhat resinous in appearance, with conchoidal fracture and vitreous luster, closely resembling obsidian or black volcanic glass, and then immerse the reel in a vessel containing ambertine to obtain a better and non-adhesive surface, such ambertine being a heavy distillate product of petroleum of a yellowish-brown color, and of a soft, waxy consistency, known as "wax-tailings;" but for general use we prefer to mix the two together with or without olivine or other compounds, such olivine being a distillate product of petroleum sometimes known as "green oil." When the froth ceases to rise, it will indicate freedom from moisture. The wire may then be reeled off on a receiving-reel placed at a proper distance for the wires to cool before reaching and winding on the reel; and we place intermediately between the reels, but nearer the first, a stripping and molding block consisting of a conical perforation or aperture through a metal block or plate to strip off any excess of the composition and gage the coating evenly.

Among the distillates of petroleum and other mineral oils is paraffine, which is usually separated from its associate compounds by mechanical pressure. In the preparation of our improved compound the paraffine is eliminated by distillation, the products which we employ being obtained after the paraffine is driven off. Its low melting-point and other features render it unfit for our use.

It may be said that electric wires properly coated and insulated with our compound or composition will withstand the various changes of temperature and moisture, and will be perfectly impervious to water, so that the wire will be preserved from oxidation, and therefore not liable to be removed after being once laid.

We claim herein as our invention—

1. In the insulation of cotton or fiber covered wires for electric uses, the process of immersing such prepared wires, in coils or otherwise, into baths of heated insulating material at high temperature to expel all moisture therefrom and saturate the fiber with mixture, substantially as and for the purpose set forth.

2. In the preparation of cotton or other fiber-covered wires for electric uses, the process of immersing such covered wire upon reels in a bath or baths of heated insulating compound, and drawing it from such bath-immersed reels by a second and storing reel through an intermediate and gaging mold or molds, substantially in the manner and for the purpose set forth.

3. The method herein described of insulating wire, consisting of first heating the compound to the required temperature, then immersing fiber-coated wire in said compound, releasing the cotton or other fiber of all moisture and thoroughly saturating it, then drawing the insulated wire through gaging devices, and finally reeling it on a receiving and storing reel, substantially as set forth.

In testimony whereof we have hereunto set our hands.

RICHARD S. WARING.
J. BURROWS HYDE.

Witnesses:
F. O. McCLEARY,
EDWARD E. ELLIS.